United States Patent
Takahashi et al.

(10) Patent No.: US 8,376,636 B2
(45) Date of Patent: Feb. 19, 2013

(54) FOCAL-PLANE SHUTTER AND OPTICAL APPARATUS

(75) Inventors: Hiroshi Takahashi, Chiba (JP); Yoichi Nakano, Chiba (JP)

(73) Assignee: Seiko Precision Inc., Narashino-shi (JP)

( * ) Notice: Subject to any disclaimer, the term of this patent is extended or adjusted under 35 U.S.C. 154(b) by 0 days.

(21) Appl. No.: 13/311,940

(22) Filed: Dec. 6, 2011

(65) Prior Publication Data
US 2012/0087646 A1 Apr. 12, 2012

Related U.S. Application Data (63) Continuation of application No. PCT/JP2010/072846, filed on Dec. 20, 2010.

(30) Foreign Application Priority Data

Apr. 28, 2010 (JP) .................................. 2010-103647

(51) Int. Cl.
*G03B 9/08* (2006.01)
(52) U.S. Cl. .................................................... 396/465
(58) Field of Classification Search .................. 396/463, 396/465–467
See application file for complete search history.

(56) References Cited

U.S. PATENT DOCUMENTS

| 4,364,654 | A | * | 12/1982 | Senuma et al. | 396/466 |
| 4,487,492 | A | * | 12/1984 | Toyoda et al. | 396/466 |
| 4,671,637 | A | * | 6/1987 | Toyoda | 396/466 |
| 2012/0008932 | A1 | * | 1/2012 | Takahashi et al. | 396/463 |
| 2012/0087646 | A1 | * | 4/2012 | Takahashi et al. | 396/470 |

FOREIGN PATENT DOCUMENTS

| JP | 5-11308 | 1/1993 |
| JP | 9-133944 | 5/1997 |
| JP | 2008-187878 A1 | 8/2008 |

OTHER PUBLICATIONS

International Search Report for International Application No. PCT/JP2010/072846 dated Feb. 1, 2011.

* cited by examiner

*Primary Examiner* — William B. Perkey
(74) *Attorney, Agent, or Firm* — Kratz, Quintos & Hanson, LLP (57) ABSTRACT

A focal plane shutter includes: an electromagnet; a board including an opening; blades capable of opening and closing the opening; a drive member holding an iron piece adsorbed to the electromagnet and driving the blades, the drive member being movable such that the iron piece moves toward and away from the electromagnet and being biased by a spring such that the iron piece moves away from the electromagnet; and a holding board facing the board and including a pair of sandwiching portions elastically deformable and holding and sandwiching the electromagnet. The electromagnet includes a restriction portion engaging the board and restricting a movement of the electromagnet in a direction where the iron piece moves away from the electromagnet.

7 Claims, 9 Drawing Sheets

FOCAL-PLANE SHUTTER AND OPTICAL APPARATUS

CROSS-REFERENCE TO RELATED APPLICATION

This application is a continuation of and claims priority to International Patent Application No. PCT/JP2010/072846 filed on Dec. 20, 2010, which claims priority to Japanese Patent Application No. 2010-103647 filed on Apr. 28, 2010, subject matter of these patent documents is incorporated by reference herein in its entirety.

BACKGROUND (i) Technical Field

The present invention relates to focal plane shutters and optical apparatus.

(ii) Related Art

A focal plane shutter includes: an electromagnet; a board including an opening; blades capable of opening and closing the opening; and a drive member driving the blades. The drive member holds an iron piece with which the electromagnet is adsorbed, and is movable such that the iron piece moves toward and away from the electromagnet, and is biased by a drive spring such that the iron piece moves away from the electromagnet. Such a focal plane shutter is disclosed in Japanese Unexamined Patent Application Publication No. 9-133944.

High speed of the blades has been demanded in a recent focal plane shutter. When the spring force of the drive spring is increased by increasing of the speed of the blades, the electromagnet might be attracted by the drive spring to be unstable, in cases where the electromagnet is secured by elastic engagement. When the electromagnet is positionally unstable, there may be variations in the position of the iron piece at the time when the iron piece moves away from the electromagnet. This might result in variations in the speed of the blades.

SUMMARY

It is therefore an object of the present invention to provide a focal plane shutter and an optical apparatus that suppress variation in the speed of blades without detracting the assemblability even when the focal plane shutter is increased in speed.

According to an aspect of the present invention, there is provided a focal plane shutter including: an electromagnet; a board including an opening; blades capable of opening and closing the opening; a drive member holding an iron piece adsorbed to the electromagnet and driving the blades, the drive member being movable such that the iron piece moves toward and away from the electromagnet and being biased by a spring such that the iron piece moves away from the electromagnet; and a holding board facing the board, and including a pair of sandwiching portions elastically deformable and holding and sandwiching the electromagnet, wherein the electromagnet includes a restriction portion engaging the board and restricting a movement of the electromagnet in a direction where the iron piece moves away from the electromagnet.

DETAILED DESCRIPTION

Figure 1:
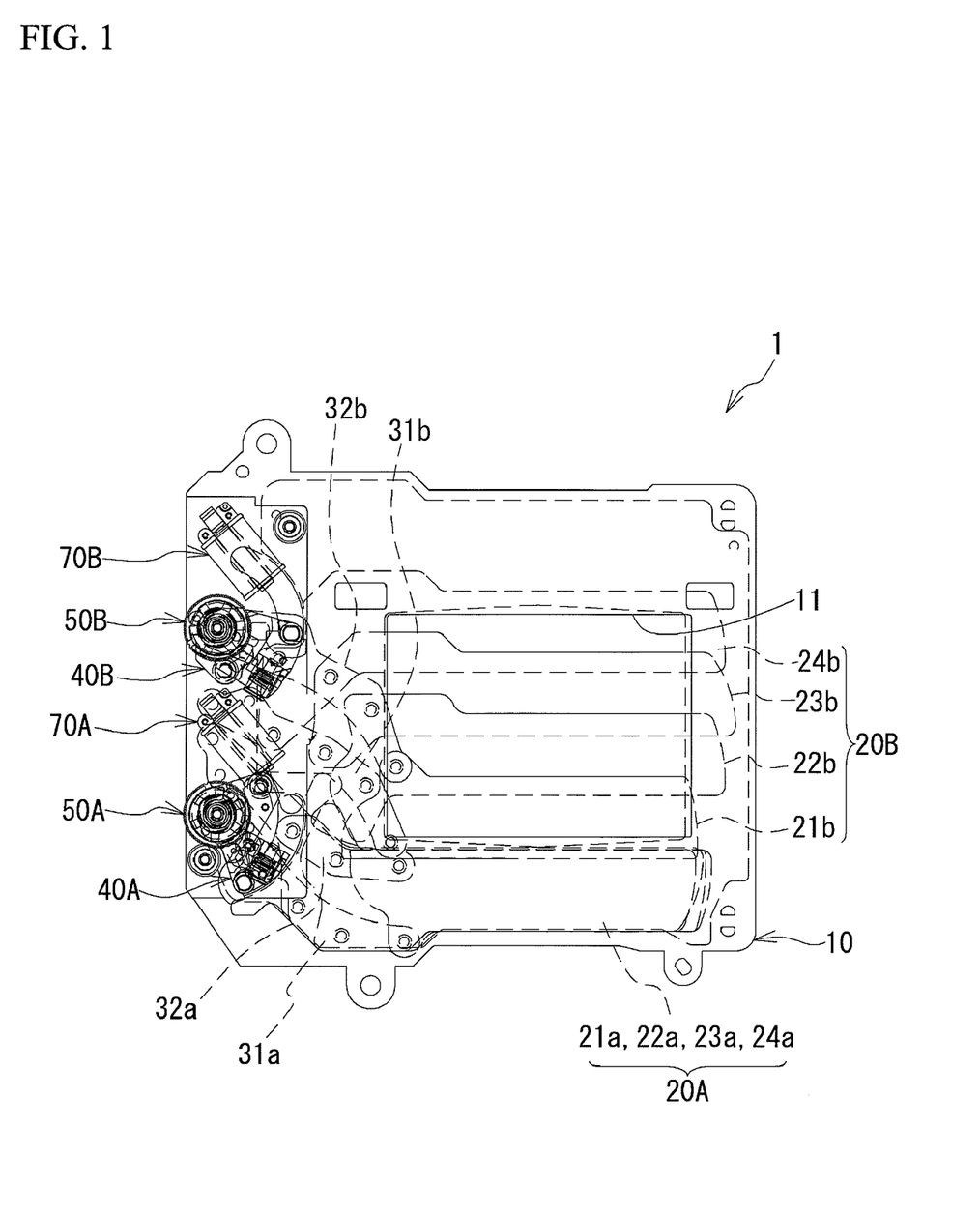
FIG. 1 is front view of a focal plane shutter according to the present embodiment.

An embodiment will be described later with reference to the drawings. In the embodiment, a focal plane shutter will be described as an example of a blade driving device. FIG. 1 is a front view of the focal plane shutter. As illustrated in FIG. 1, the focal plane shutter 1 includes: a board 10; blades 21a to 24a and 21b to 24b; drive arms 31a, 32a, 31b, and 32b; and electromagnets 70A and 70B. The board 10 is made of a synthetic resin, and includes an opening 11 with a rectangular shape. Each of the blades 21a to 24a and 21b to 24b is made of a synthetic resin and is thinly formed. Also, each of the drive arms 31a, 32a, 31b, and 32b is made of a metal sheet to retain its strength. Each of the blades 21a to 24a and 21b to 24b move between a position of receding from the opening 11 and a position of covering at least part of the opening 11.

Four blades 21a to 24a configure leading blades 20A. Four blades 21b to 24b configure trailing blades 20B. The leading blades 20A and the trailing blades 20B open and close the opening 11. FIG. 1 illustrates the leading blades 20A in an overlapped state and the trailing blades 20B in an expanded state. In FIG. 1, the leading blades 20A recedes from the opening 11 and the trailing blades 20B close the opening 11.

The leading blades 20A are connected to the drive arms 31a and 32a. The trailing blades 20B are connected to the drive arms 31b and 32b. These drive arms 31a, 32a, 31b, and 32b are swingably supported by the board 10.

A leading blades-drive lever 40A for driving the drive arm 31a and a trailing blades-drive lever 40B for driving the drive arm 32b are provided in the board 10. The leading blades-drive lever 40A and the trailing blades-drive lever 40B are supported by the board 10 to be swingable in a predetermined range. Specifically, the trailing blades-drive lever 40A is supported to swing about a spindle provided in the board 10. This configuration is applied to the trailing blades-drive lever 40B. The leading blades-drive lever 40A and the trailing blades-drive lever 40B correspond to drive members driving the leading blades 20A and the trailing blades 20B, respectively. The leading blades-drive lever 40A and the trailing blades-drive lever 40B are each made of a synthetic resin.

The drive arm 31a is connected to the leading blades-drive lever 40A. The drive arm 32b is connected to the trailing blades-drive lever 40B. The swinging of the leading blades-drive lever 40A causes the drive arm 31a to swing, thereby moving the leading blades 20A. Likewise, the swinging of the trailing blades-drive lever 40B causes the drive arm 32b to swing, thereby moving the trailing blades 20B.

The leading blades-drive lever 40A and the trailing blades-drive lever 40B each holds an iron piece which does not have a reference numeral. The leading blades-drive lever 40A can swing between the position where the iron piece abuts the electromagnet 70A and the position where the iron piece recedes from the electromagnet 70A. That is, the leading-blades drive lever 40A is movable such that the iron piece moves toward and away from the electromagnet 70A. This is applied to the trailing blades-drive lever 40B.

Figure 4:
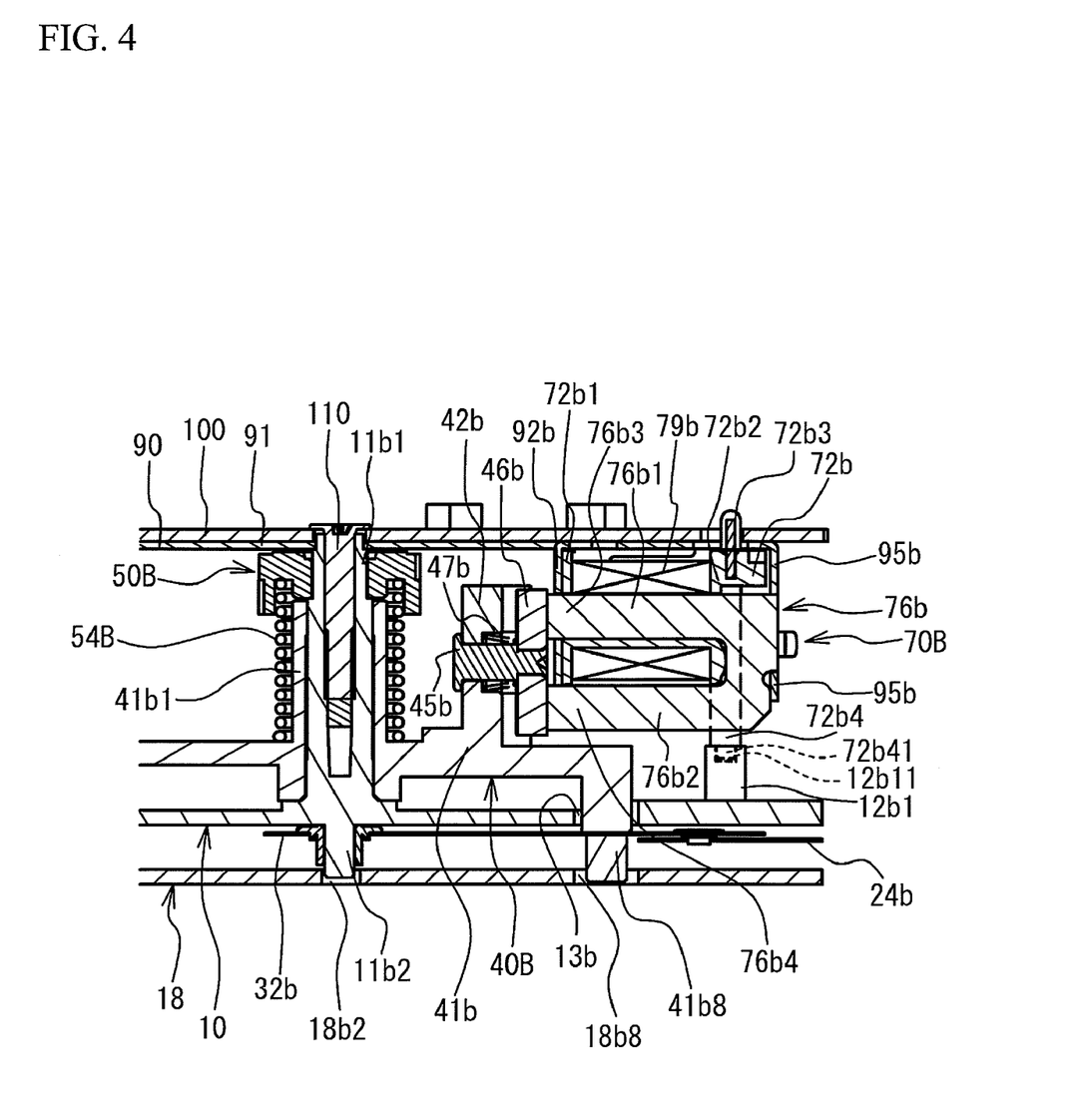
FIG. 4 is a sectional view around a trailing blades-drive lever adsorbed to an electromagnet and the electromagnet.

Also, the leading blades-drive lever 40A is biased by a spring, not illustrated, in such a direction that the iron piece moves away from the electromagnet 70A. Likewise, the trailing blades-drive lever 40B is biased by a spring, not illustrated, in such a direction that the iron piece moves away from the electromagnet 70B. Additionally, FIG. 4 illustrates the iron piece and the spring of the trailing blades-drive lever 40B, as will be described later.

Ratchet wheels 50A and 50B engage the leading blades-drive lever 40A and the trailing blades-drive lever 40B, respectively, through the springs mentioned above. One end of the spring, which biases the leading blades-drive lever 40A in such a direction as to move away from the electromagnet 70A, engages the ratchet wheel 50A. The other end of the spring engages the leading blades-drive lever 40A. The rotational amount of the ratchet wheel 50A is adjusted, thereby adjusting the biasing force of the spring. The ratchet wheel 50B also has a function similar to the ratchet wheel 50A.

The electromagnet 70A is energized, thereby adsorbing the iron piece of the leading blades-drive lever 40A. Likewise, the electromagnet 70B is energized, thereby adsorbing the iron piece of the trailing blades-drive lever 40B.

Figure 2:
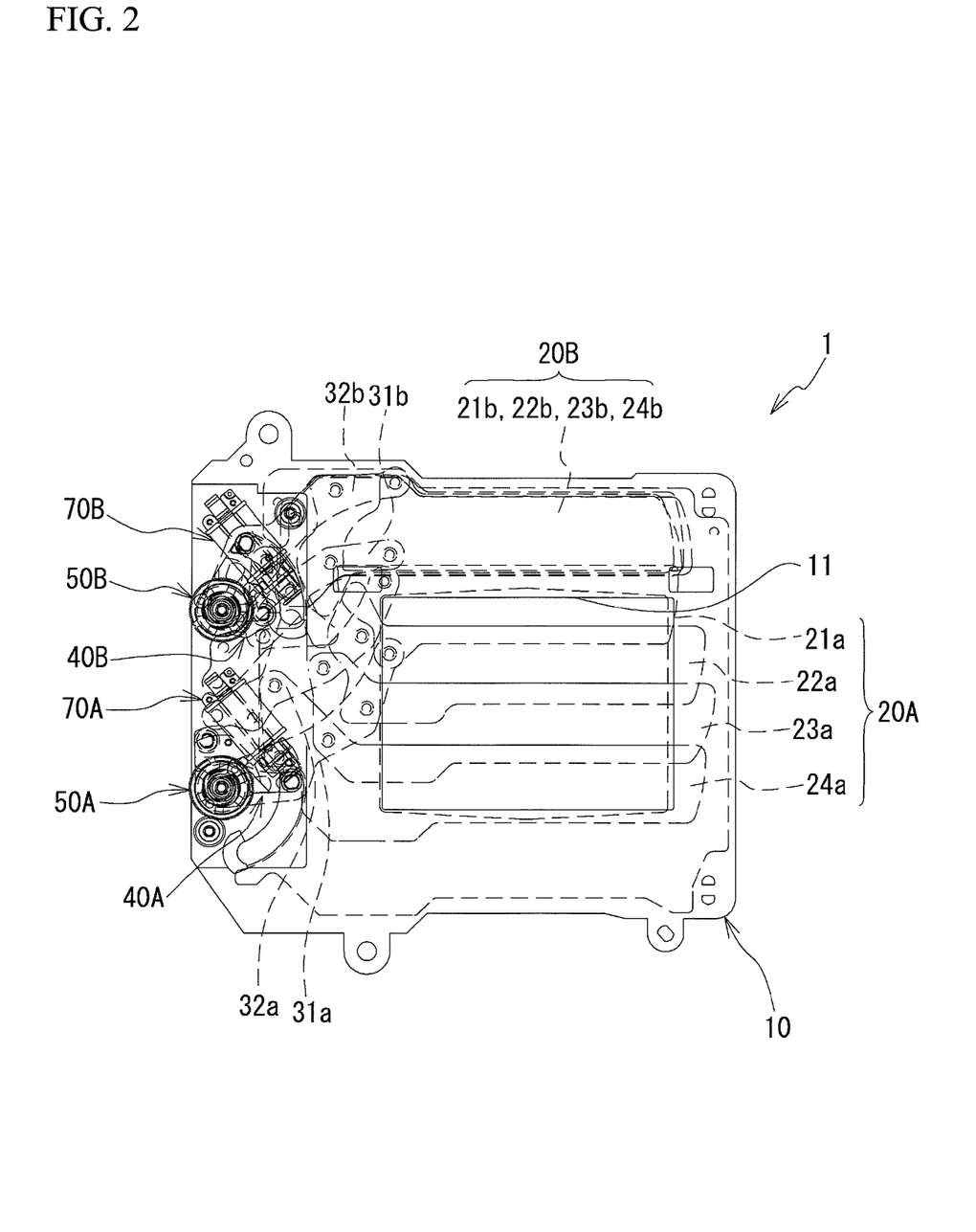
FIG. 2 is an explanatory view of an operation of the focal plane shutter.
Figure 3:
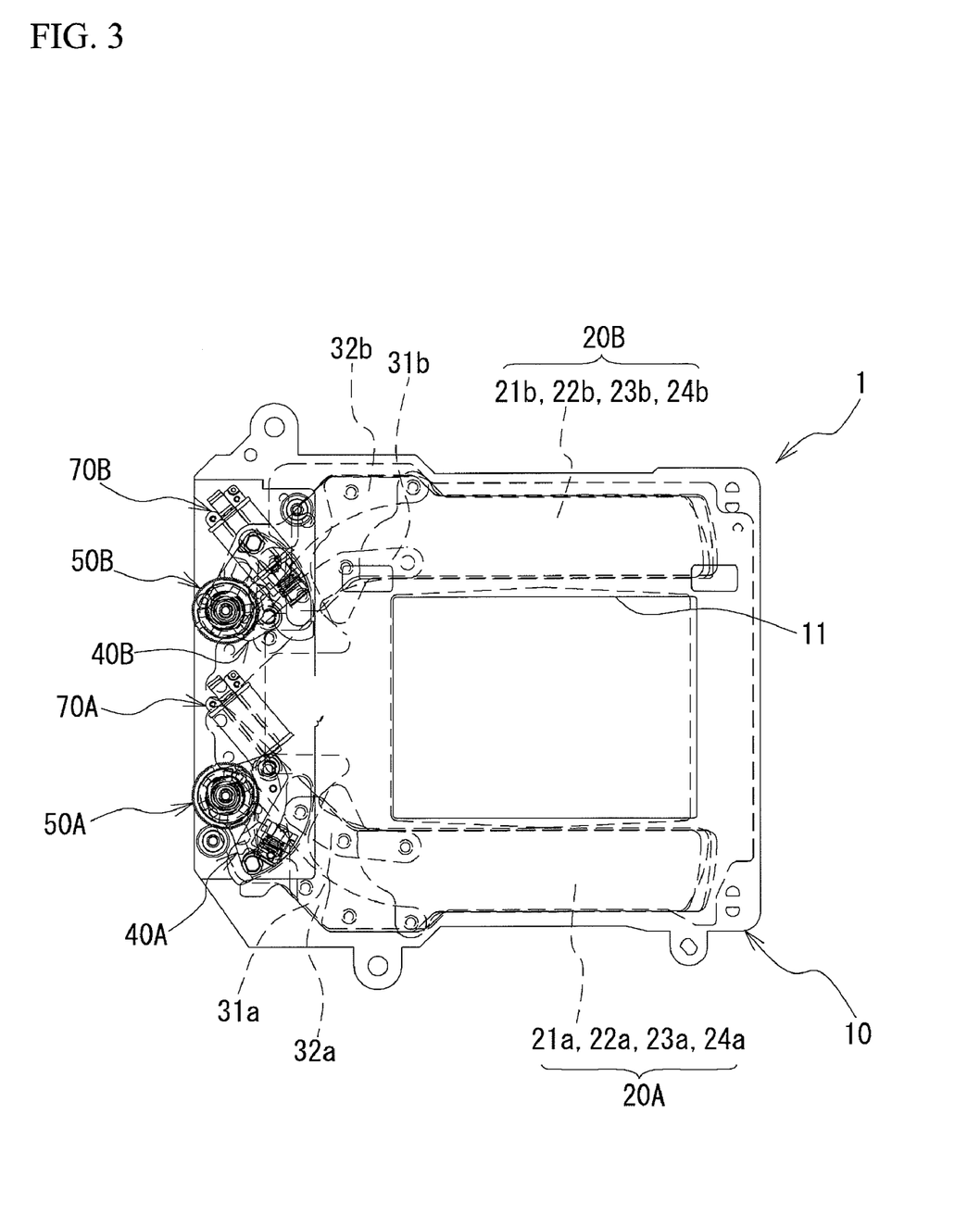
FIG. 3 is an explanatory view of the operation of the focal plane shutter.

Next, the operation of the focal plane shutter 1 will be described. FIGS. 1 to 3 are explanatory views of the operation of the focal plane shutter 1. Here, FIG. 2 illustrates the focal plane shutter 1 in an initial state. In this initial state, a set lever not illustrated is secured to an initial position, the leading blades 20A are expanded to close the opening 11, and the trailing blades 20B are overlapped each other to recede from the opening 11. In this initial state, the iron pieces of the leading blades-drive lever 40A and the trailing blades-drive lever 40B abut the electromagnets 70A and 70B respectively, and are set to be adsorbed thereto.

In shooting, a release button of the camera is pushed to energize coils of the electromagnets 70A and 70B, whereby the iron piece of the leading blades-drive lever 40A is adsorbed to the electromagnet 70A and the iron piece of the trailing blades-drive lever 40B is adsorbed to the electromagnet 70B. After that, the set lever moves away from the leading blades-drive lever 40A and the trailing blades-drive lever 40B. At this time, the leading blades-drive lever 40A and the trailing blades-drive lever 40B remain adsorbed to the electromagnets 70A and 70B, respectively.

Afterward, the energization of the coil of the electromagnet 70A is stopped, thereby rotating the leading blades-drive lever 40A clockwise by the biasing force of the spring as illustrated in FIG. 3. Therefore, the leading blades 20A move away from the opening 11 to be in the overlapped state. Also, the energization of the coil of the electromagnet 70B remains for a predetermined period, whereas the trailing blades 20B remain away from the opening 11. This causes the opening 11 to be in an opened state. FIG. 3 illustrates an exposed state.

After a predetermined period lapses from a time when the release button is pushed, the energization of the coil of the electromagnet 70B is stopped, and then the trailing blades-drive lever 40B rotates clockwise by the biasing force of the spring. Therefore, the trailing blades 20B are expanded to close the opening 11. The trailing blades-drive lever 40B abuts an end portion of the slot formed in the board 10. FIG. 1 illustrates the state just after the exposure operation is finished. In such a way, one cycle of shooting is finished.

Next, the leading blades-drive lever 40A and the trailing blades-drive lever 40B are rotated counterclockwise by the set lever not illustrated. Therefore, the leading blades 20A are expanded to close the opening 11 and the trailing blades 20B are overlapped each other to recede from the opening 11, whereby the state is returned to the initial state illustrated in FIG. 2.

Next, the electromagnet 70B will be described in detail. FIG. 4 is a sectional view around the trailing-blades drive lever 40B and the electromagnet 70B in the state where the trailing-blades drive lever 40B is adsorbed to and held by the electromagnet 70B.

The trailing blades-drive lever 40B includes: a board-shaped base portion 41b; a cylindrical portion 41b1 and a drive pin 41b8 standing on the base portion 41b; a holding portion 42b holding an iron piece 46b; and the like. Around the cylindrical portion 41b1, there are provided the ratchet wheel 50B and a spring 54B for giving the trailing blades-drive lever 40B a biasing force. One end of the spring 54B is secured to the trailing blades-drive lever 40B side, and the other end of the spring 54B is secured to the ratchet wheel 50B side. The rotational amount of the ratchet wheel 50B is adjusted, thereby adjusting the biasing force of the spring 54B. The spring 54B biases the trailing blades-drive lever 40B in such a direction as to move away from the electromagnet 70B.

A spindle 11b1 provided in the board 10 is fitted into the cylindrical portion 41b1. The trailing blades-drive lever 40B rotates about the spindle 11b1 in a predetermined range. The spindle 11b1 is secured at its end with a holding board 90 by a pin 110. A printed circuit board 100 is secured on an upper surface of the holding board 90. The holding board 90 holds the electromagnets 70A and 70B. The printed circuit board 100 controls the energization of the electromagnets 70A and 70B.

The drive pin 41b8 extends downwardly from the base portion 41b. The drive pin 41b8 is fitted onto the drive arm 32b. Further, an escape hole 13b for escaping the drive pin 41b8 is formed in the board 10. A spindle 11b2 is coaxially formed with the spindle 11b1 in the board 10. The drive arm 32b rotatably fits onto the spindle 11b2. The drive arm 32b rotates about the spindle 11b2 in a predetermined range.

The holding portion 42b has a wall shape standing upwardly on the base portion 41b. A pin 45b fitted into the iron piece 46b penetrates through the holding portion 42b. The pin 45b penetrates through the holding portion 42b in such a manner as to move in a given range in an axial direction of the pin 45b. A spring 47b biases the holding portion 42b and the iron piece 46b such that they move away from each other, and is arranged therebetween. The spring 47b has a function to absorb an impact at the time when the iron piece 46b abuts an iron core 76b of the electromagnet 70B as will be described later.

A rear board 18 faces the board 10. The drive arm 32b, the trailing blades 20B, and the like are housed between the board 10 and the rear board 18. The rear board 18 is formed with escape slots 18b8 and 18b2 for escaping the drive pin 41b8 and the spindle 11b2, respectively.

Figure 5:
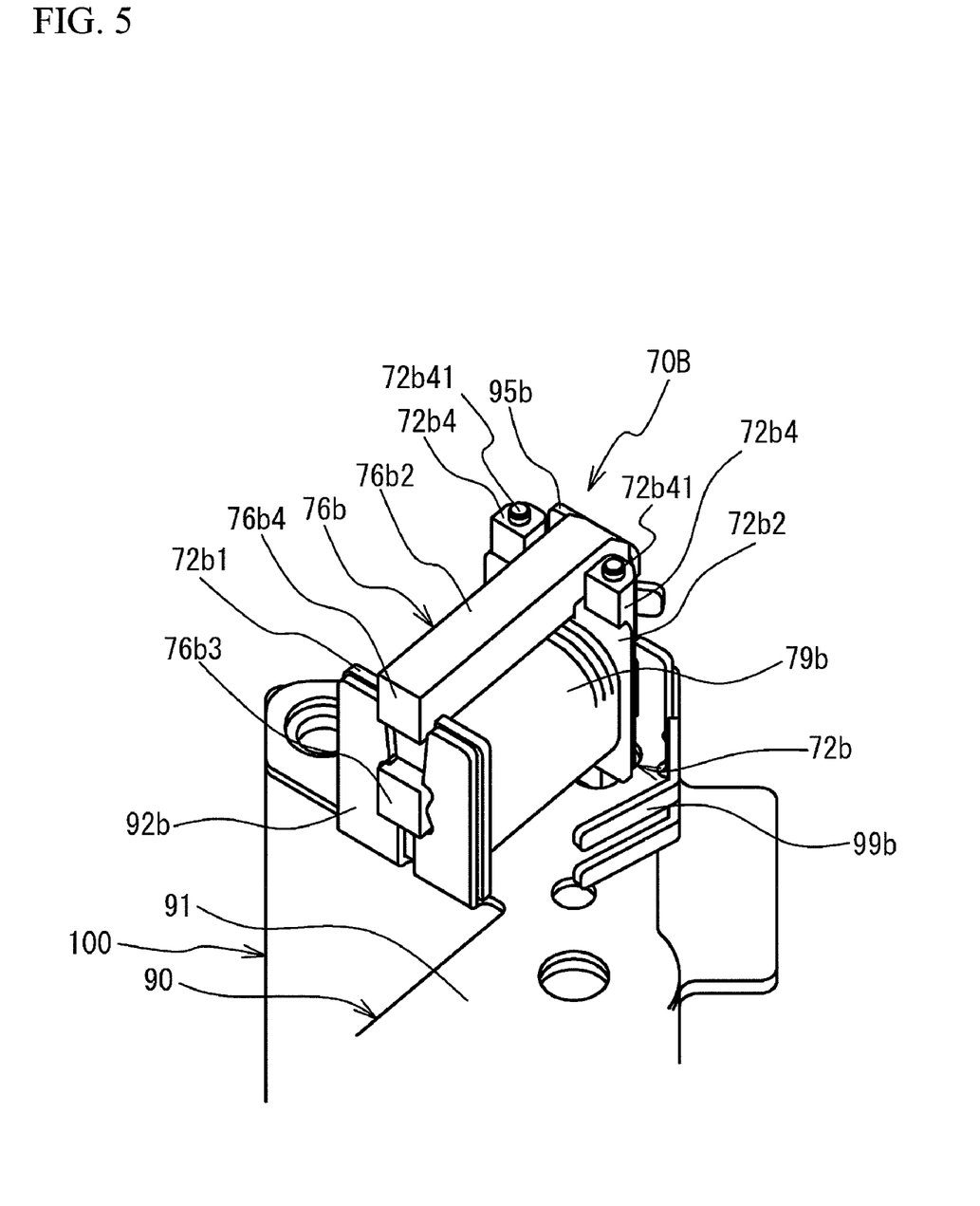
FIG. 5 is a perspective view of the electromagnet, a holding board, and a printed circuit board in the state where a board and a rear board are removed.

FIG. 5 is a perspective view of the electromagnet 70B, the holding board 90, and the printed circuit board 100 in the state where the board 10 and the rear board 18 are removed. The electromagnet 70B includes: the iron core 76b; a coil 79b for exciting the iron core 76b; and a bobbin 72b around which the coil 79b is wound. The energization of the coil 79b generates the magnetic attraction force between the iron core 76b and the iron piece 46b.

The iron core 76b has a letter U shape as illustrated in FIG. 4. The iron core 76b includes arm portions 76b1 and 76b2 extending in parallel with each other in a given direction. The arm portion 76b1 is inserted into the bobbin 72b. The arm portions 76b1 and 76b2 respectively have end portions 76b3 and 76b4. The end surfaces of the end portions 76b3 and 76b4 are adsorbed with the iron piece 46b.

The bobbin 72b includes: a body portion around which the coil 79b is wound; flange portions 72b1 and 72b2 respectively provided at both ends of the body portion; a terminal portion 72b3 around which the end of the coil 79b is wound; and restriction portions 72b4 engaging the board 10. The bobbin 72b is made of a synthetic resin. The coil 79b is wound between the flange portions 72b1 and 72b2. The terminal portion 72b3 is electrically connected to a pattern formed in the printed circuit board 100 by soldering. Therefore, the electromagnet 70B and the printed circuit board 100 are electrically connected to each other.

As illustrated in FIG. 4, the restriction portions 72b4 extend toward the board 10 in the vicinity of a sandwiching portion 95b. The restriction portions 72b4 are provided at the flange portion 72b2 side. The restriction portions 72b4 engage supporting portions 12b1 of the board 10. The supporting portions 12b1 extend from the board 10 toward the holding board 90. As illustrated in FIG. 5, two restriction portions 72b4 are provided to sandwich the iron core 76b. The board 10 is provided with two supporting portions 12b1 corresponding to two restriction portions 72b4. The restriction portion 72b4 is provided at its end with a projection portion 72b41 having a round shape. The supporting portion 12b1 is provided at its end with a recess portion 12b11 fitted onto the projection portion 72b41. The recess portion 12b11 also has a round shape corresponding to the shape of the projection portion 72b41.

The holding board 90 includes: a flat board portion 91 having a flat board shape; and a pair of sandwiching portions 92b and 95b standing on the flat board portion 91. The holding board 90 is made of a metal and has a thin board shape elastically deformable. The flat board portion 91 is secured with the printed circuit board 100. The sandwiching portions 92b and 95b stand on the flat board portion 91 to extend toward the board 10. The sandwiching portions 92b and 95b sandwich and hold the electromagnet 70B. Specifically, the sandwiching portion 92b engages the iron core 76b while abutting the bobbin 72b, and the sandwiching portion 95b engages a rear end side of the iron core 76b. The sandwiching portions 92b and 95b hold the electromagnet 70B in such a manner as to sandwich the bobbin 72b and the iron core 76b in the direction where the iron piece 46b moves away from the iron core 76b. That is, the electromagnet 70B is held by the holding board 90. The sandwiching portions 95b and 92b are arranged in the direction where the iron piece 46b moves away from the iron core 76b.

When the electromagnet 70B is assembled into the holding board 90, the electromagnet 70B is inserted between the sandwiching portions 92b and 95b. Herein, since the sandwiching portions 92b and 95b are elastically deformable, the electromagnet 70B is inserted between the sandwiching portions 92b and 95b with ease.

Additionally, FIG. 5 illustrates a nail portion 99b engaging the ratchet wheel 50B and stopping the rotation thereof. The nail portion 99b is integrally formed with the holding board 90.

Figure 6A:
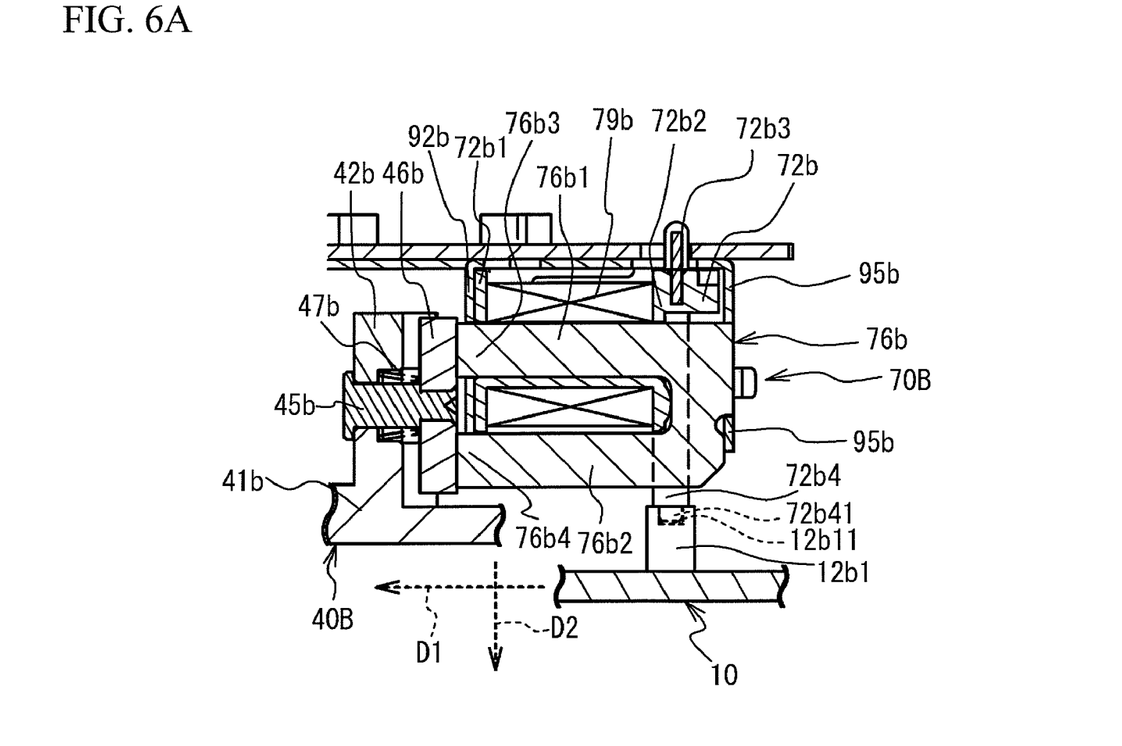
FIGS. 6A and 6B are explanatory views when the trailing blades-drive lever moves away from the electromagnet.
Figure 6B:
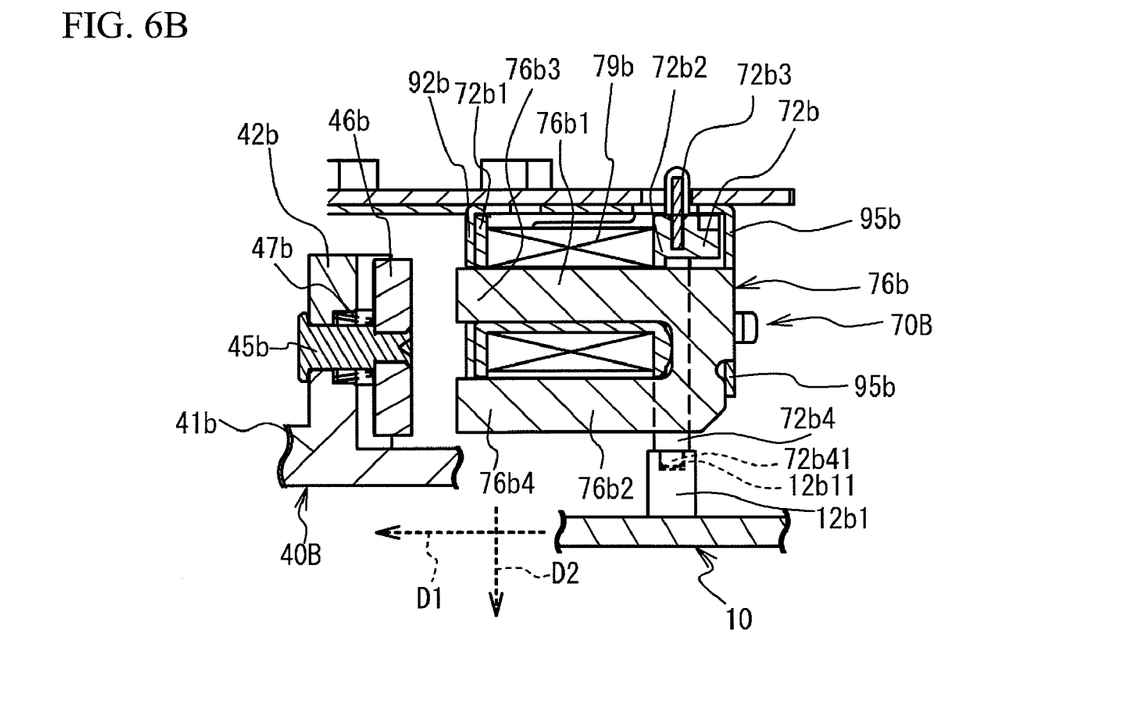

Next, a description will be given of the state where the energization of the electromagnet 70B is stopped to move the trailing blades-drive lever 40B away from the electromagnet 70B after the state where the trailing blades-drive lever 40B is adsorbed to and held by the electromagnet 70B. FIGS. 6A and 6B are explanatory views when the trailing blades-drive lever 40B moves away from the electromagnet 70B.

FIG. 6A illustrates the state where the trailing blades-drive lever 40B is adsorbed to and held by the electromagnet 70B. The iron piece 46b and the iron core 76b are maintained in contact with each other by the magnetic attraction force. The enegization of the electromagnet 70B is stopped in this state, whereby the iron core 76b loses the magnetic attraction force. Therefore, the trailing blades-drive lever 40B is rotated by the biasing force of the spring 54B such that the iron piece 46b moves away from the iron core 76b.

Therefore, the iron piece 46b moves away from the iron core 76b as illustrated in FIG. 6B. The iron piece 46b moves in a direction D1.

Figure 7:
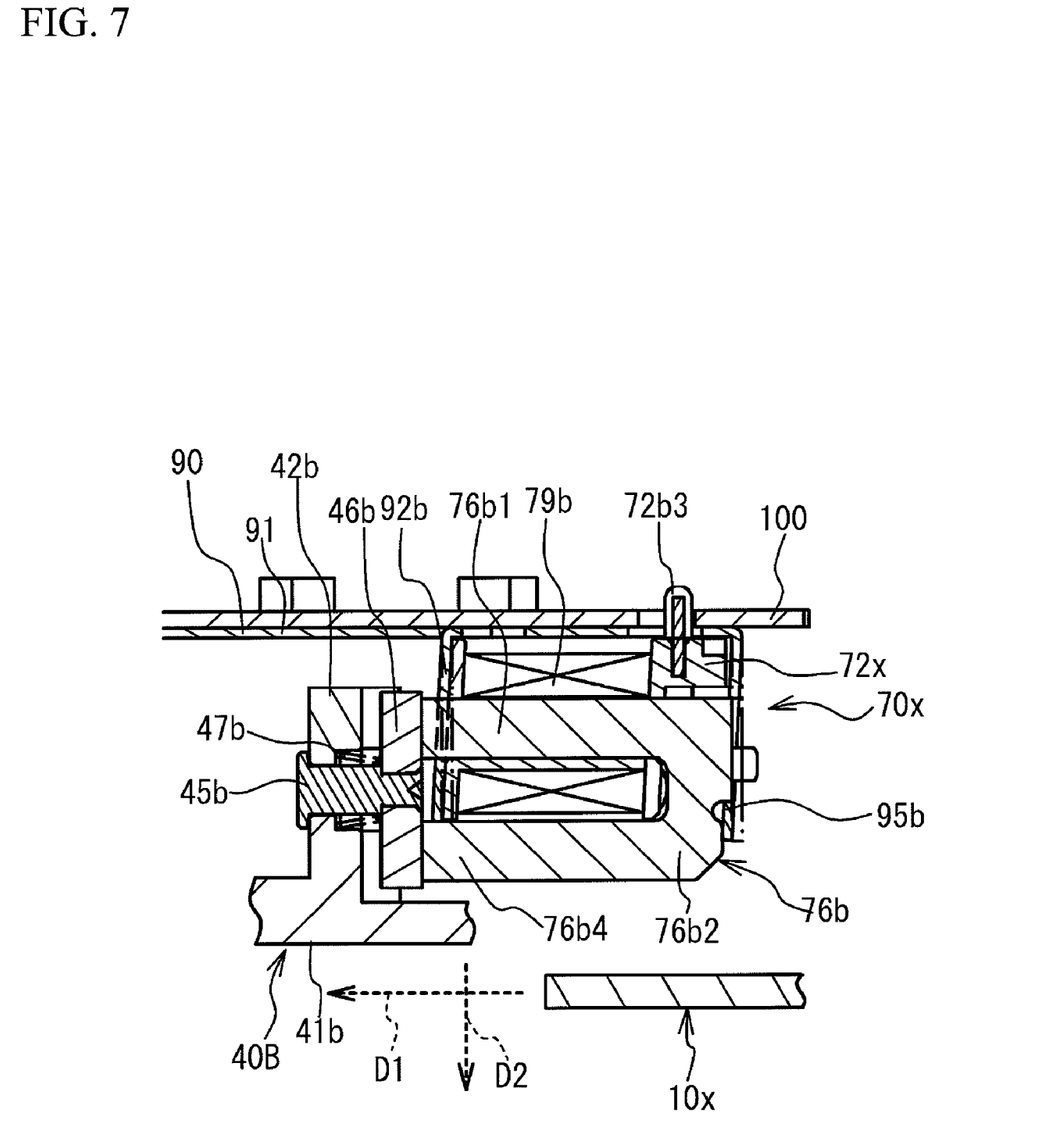
FIG. 7 is an explanatory view of a focal plane shutter having a structure different from that of the present embodiment.

FIG. 7 is an explanatory view of a focal plane shutter having a different structure from that of the present embodiment. FIG. 7 corresponds to FIG. 6A. Unlike the present embodiment, the focal plane shutter illustrated in FIG. 7 does not have a restriction portions 72b4. That is, an electromagnet 70X is held by the holding board 90 in such a manner so as to be merely sandwiched by the sandwiching portions 92b and 95b. As illustrated in FIG. 7, the iron piece 46b and the iron core 76b are maintained in contact with each other by the magnetic attraction force in the state where the trailing blades-drive lever 40B is adsorbed to and held by the electromagnet 70X. However, the iron core 76b is slightly moved by the biasing force of the spring 54B in the direction D1 in such a manner as to follow the movement of the iron piece 46b, as compared with FIG. 6A. This is because the sandwiching portions 92b and 95b holding the electromagnet 70X are elastically deformable with ease. The positions of the sandwiching portions 92b and 95b before the energization of the electromagnet 70X are illustrated by dashed lines in FIG. 7. The energization of the electromagnet 70X is stopped in this state, whereby the iron core 76b loses the magnetic attraction force. Therefore, the trailing blades-drive lever 40B is rotated by the biasing force of the spring 54B such that the iron piece 46b moves away from the iron core 76b. Since the sandwiching portions 92b and 95b holding the electromagnet 70X are elastically deformed in the state illustrated in FIG. 7, the electromagnet 70X moves in the direction D1 as compared with the state illustrated in FIG. 6A. For this reason, it is difficult to stabilize the position of the electromagnet 70X in the direction D1. In particular, there occurs a variation in the position of the electromagnet 70X in the direction D1 in continuous shooting such as the shooting operations repeated at high speed.

In such a way, a variation in the position of the electromagnet 70X occurs at the time when the iron piece 46b moves away from the iron core 76b, thereby causing variations in the position of the iron piece 46b at the time when the iron piece 46b moves away from the electromagnet 70X. The variation in the position of the iron piece 46b occurs, thereby causing variations in the position where the trailing blades 20B starts traveling. This might result in variations in the speed of the trailing blades 20B.

In the present embodiment, the restriction portions 72b4 engage the board 10 in such a position to face the holding board 90 in the vicinity of the sandwiching portion 95b such that the iron core 76b does not move in the direction D1 as illustrated in FIGS. 6A and 6B. Therefore, the position of the electromagnet 70B does not move relative to the board 10. This suppresses a variation in the position of the iron piece 46b when the iron piece 46b moves away from the iron core 76b. This also results in suppressing variations in the speed of the trailing blades 20B. Further, the assemblability of the electromagnet is not degraded, since the restriction portion 72b4 engages the board 10 in such a position to face the holding board 90.

Furthermore, the restriction portion 72b4 extends in a direction D2 perpendicular to the direction D1. This suppresses the electromagnet 70B from moving upwardly or downwardly in the direction D2. In other words, the restriction portion 72b4 prevents the electromagnet 70B from moving downwardly to be disengaged from the sandwiching portions 92b and 95b.

Figure 8:
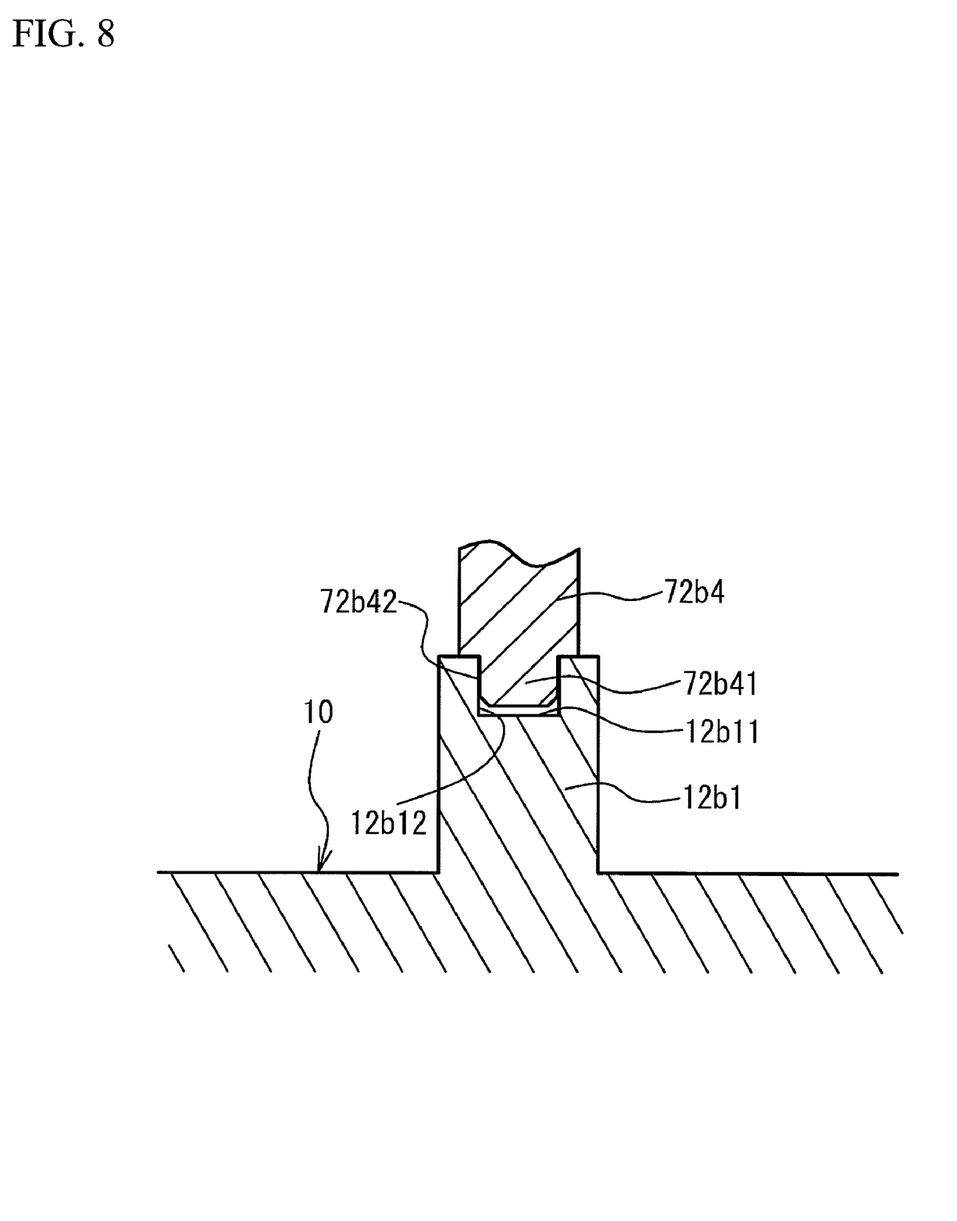
FIG. 8 is a sectional view of a restriction portion of the focal plane shutter according to the present embodiment.

FIG. 8 is a sectional view of the restriction portion of the focal plane shutter according to the present embodiment. The diameter of the projection portion 72b41 is smaller than that of the restriction portion 72b4. The projection portion 72b41 fits into the recess portion 12b11. The size of the recess portion 12b11 is substantially the same with that of the projection portion 72b41. The projection portion 72b41 fits into the recess portion 12b11, thereby preventing the restriction portion 72b4 from inclining relative to the direction D2. Specifically, an outer circumferential surface 72b42 of the projection portion 72b41 and an inner circumferential surface 12b12 of the recess portion 12b11 abut each other, thereby preventing the 72b4 from inclining relative to the direction D2. This prevents the posture of the electromagnet 70B from inclining relative to the board 10.

In the structure illustrated in FIG. 7, the electromagnet 70X might incline relative to a board 10x, since the electromagnet 70X is held to be merely sandwiched by the sandwiching portions 92b and 95b. The positions of the end surfaces of the end portions 76b3 and 76b4 are different between the cases where the electromagnet 70X inclines relative to the board 10x and the cases where the electromagnet 70X does not incline relative to the board 10x. This might vary the position of the iron piece 46b when the iron piece 46b moves away from the iron core 76b. In the present embodiment, the posture of the electromagnet 70B is prevented from inclining. This also suppresses a variation in the position where the iron piece 46b moves away from the iron core 76b.

Additionally, each of the projection portion 72b41 and the recess portion 12b11 fitting with each other has a round shape, but is not limited to this shape. For example, each of the projection portion 72b41 and the recess portion 12b11 may has a polygonal shape such as a triangular shape or a quadrangular shape.

Figure 9:
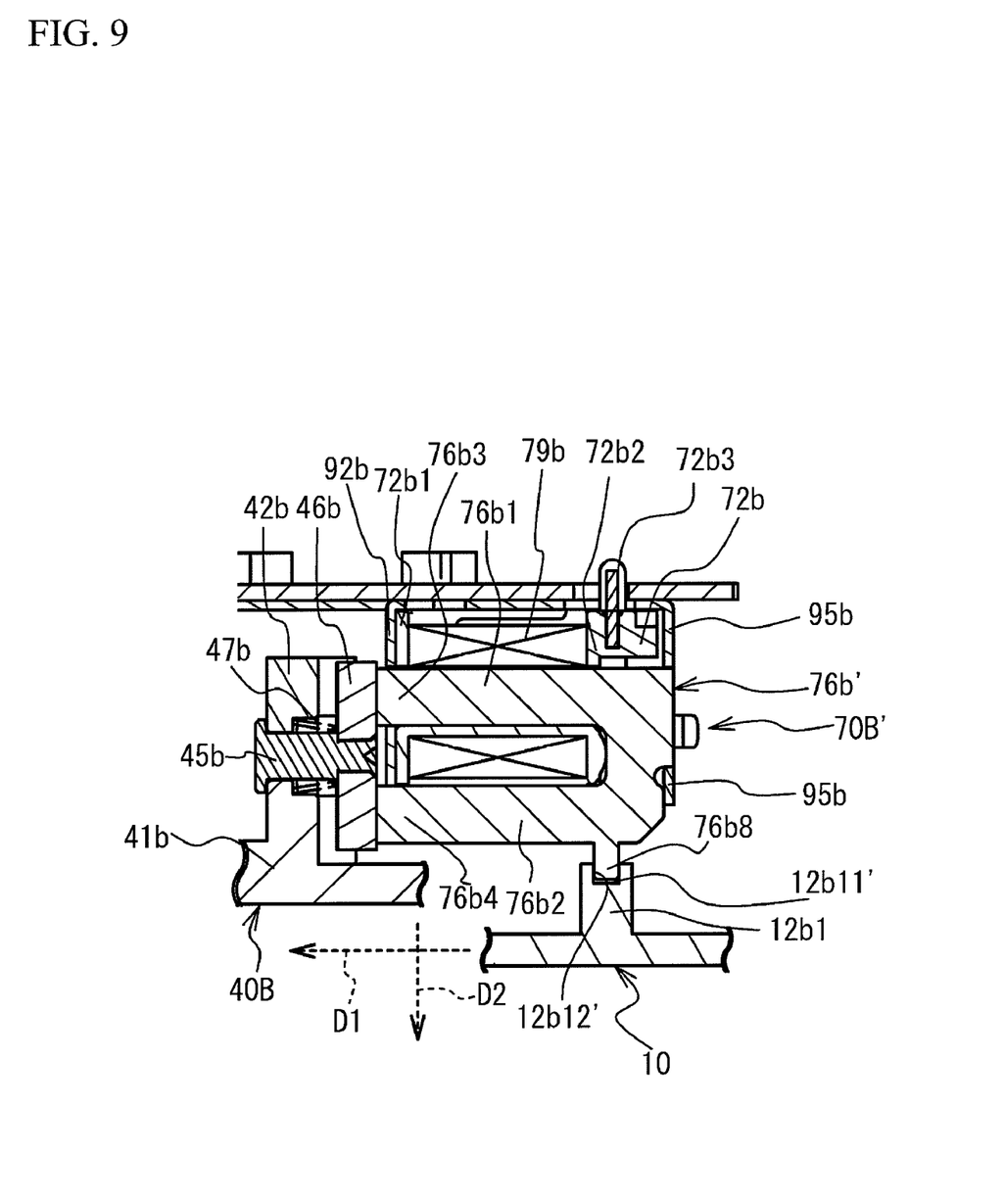
FIG. 9 is an explanatory view of a focal plane shutter according to a variation.

Next, a variation according to the focal plane shutter will be described. FIG. 9 is an explanatory view of the variation according to the focal plane shutter. Additionally, the like components in the embodiment described above are designated with the same reference numerals and the duplication description is omitted. An electromagnet 70B' includes a iron core 76b'. The iron core 76b' is provided with a restriction portion 76b8 engaging the board 10. The restriction portion 76b8 is provided in the vicinity of the arm portion 76b2 near the board 10, and extends toward the board 10. Herein, the restriction portion 76b8 and an inner circumferential surface 12b12' of a recess portion 12b11' abut each other, thereby preventing the restriction portion 76b8 from inclining relative to the direction D2. Such a configuration also suppresses variations in the position of the iron piece 46b when the iron piece 46b moves away from the iron core 76b'. This also results in suppression of variations in the speed of the trailing blades 20B.

Further, the restriction portion 72b8 extends in the direction D2 perpendicular to the direction D1 as illustrated in FIG. 9. This restricts the electromagnet 70B' from moving upwardly and downwardly in the direction D2. In other words, the restriction portion 72b8 prevents the electromagnet 70B' from moving downwardly to be disengaged from the sandwiching portions 92b and 95b.

While the exemplary embodiments of the present invention have been illustrated in detail, the present invention is not limited to the above-mentioned embodiments, and other embodiments, variations and modifications may be made without departing from the scope of the present invention.

The focal plane shutter according to the present embodiment can be employed in an optical apparatus such as a still camera or a digital camera.

In the embodiment, the electromagnet 70B including the restriction portion 72b4 has been described. However, the electromagnet 70A may be provided with a restriction portion similar to the restriction portion 72b4. This suppresses the variation in the speed of the leading blades 20A.

The restriction portion 72b4 is provided at the flange portion 72b2 side, but may be provided at the flange portion 72b1 side in the vicinity of the sandwiching portion 92b.

Finally, several aspects of the present invention are summarized as follows.

According to an aspect of the present invention, there is provided a focal plane shutter including: an electromagnet; a board including an opening; blades capable of opening and closing the opening; a drive member holding an iron piece adsorbed to the electromagnet and driving the blades, the drive member being movable such that the iron piece moves toward and away from the electromagnet and being biased by a spring such that the iron piece moves away from the electromagnet; and a holding board facing the board and including a pair of sandwiching portions elastically deformable and holding and sandwiching the electromagnet, wherein the electromagnet includes a restriction portion engaging the board and restricting a movement of the electromagnet in a direction where the iron piece moves away from the electromagnet.

The electromagnet is suppressed from moving in the direction where the iron piece moves away from the electromagnet, thereby suppressing a variation in the position of the iron piece at the time when the iron piece moves away from the electromagnet. This can suppress variations in the speed of the blades.

According to another aspect of the present invention, there is provided an optical apparatus including the above focal plane shutter.

What is claimed is:
1. A focal plane shutter comprising:
an electromagnet;
a board including an opening;
blades capable of opening and closing the opening;
a drive member holding an iron piece adsorbed to the electromagnet and driving the blades, the drive member being movable such that the iron piece moves toward and away from the electromagnet and being biased by a spring such that the iron piece moves away from the electromagnet; and
a holding board facing the board and including a pair of sandwiching portions elastically deformable and holding and sandwiching the electromagnet, wherein the electromagnet includes a restriction portion engaging the board and restricting a movement of the electromagnet in a direction where the iron piece moves away from the electromagnet.

2. The focal plane shutter of claim 1, wherein the pair of sandwiching portions sandwich and hold the electromagnet in the direction where the iron piece moves away from the electromagnet.

3. The focal plane shutter of claim 1, wherein the restriction portion restricts the electromagnet from inclining.

4. The focal plane shutter of claim 1, wherein the restriction portion restricts the electromagnet from disengaging from the sandwiching portions.

5. The focal plane shutter of claim 1, wherein the restriction portion has a projection shape extending from the electromagnet toward the board.

6. The focal plane shutter of claim 1,
wherein the electromagnet includes:
an iron core, a magnetic force generated between the iron core and the iron piece;
a coil exciting the iron core; and
a coil bobbin around which the coil is wound, and the restriction portion is provided in the coil bobbin or the iron core.

7. An optical apparatus comprising a focal plane shutter, the focal plane shutter comprising:
an electromagnet;
a board including an opening;
blades capable of opening and closing the opening;
a drive member holding an iron piece adsorbed to the electromagnet and driving the blades, the drive member being movable such that the iron piece moves toward and away from the electromagnet and being biased by a spring such that the iron piece moves away from the electromagnet; and
a holding board facing the board and including a pair of sandwiching portions elastically deformable and holding and sandwiching the electromagnet,
wherein the electromagnet includes a restriction portion engaging the board and restricting a movement of the electromagnet in a direction where the iron piece moves away from the electromagnet.

\* \* \* \* \*